(12) United States Patent
Choi et al.

(10) Patent No.: US 8,220,829 B2
(45) Date of Patent: Jul. 17, 2012

(54) ROOF AIR BAG MOUNTING STRUCTURE

(75) Inventors: Hyeong Ho Choi, Gwangmyeong-si (KR); Hyock In Kwon, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 273 days.

(21) Appl. No.: 12/616,614

(22) Filed: Nov. 11, 2009

(65) Prior Publication Data

US 2011/0049845 A1 Mar. 3, 2011

(30) Foreign Application Priority Data

Aug. 27, 2009 (KR) .................. 10-2009-0079676

(51) Int. Cl.
*B60R 21/16* (2006.01)
(52) U.S. Cl. ................... 280/730.1; 280/728.2
(58) Field of Classification Search ............... 280/730.1, 280/728.1, 728.2
See application file for complete search history.

(56) References Cited

U.S. PATENT DOCUMENTS

| | | | | |
|---|---|---|---|---|
| 2,834,606 | A | * | 5/1958 | Bertrand .................... 280/730.1 |
| 7,222,877 | B2 | * | 5/2007 | Wipasuramonton et al. ......................... 280/730.1 |
| 2002/0101067 | A1 | | 8/2002 | Breed |

FOREIGN PATENT DOCUMENTS

| | | |
|---|---|---|
| JP | 7-117605 A | 5/1995 |
| JP | 3043738 U | 9/1997 |
| JP | 2008-247113 A | 10/2008 |
| KR | 1998-018063 U | 7/1998 |
| KR | 1999-0029174 U | 7/1999 |
| KR | 10-0289635 | 2/2001 |
| KR | 20-0301802 Y1 | 1/2003 |
| WO | WO 94/25314 A1 | 11/1994 |

* cited by examiner

*Primary Examiner* — Eric Culbreth
(74) *Attorney, Agent, or Firm* — Morgan, Lewis & Bockius LLP

(57) ABSTRACT

A roof air bag mounting structure includes a frame having a plurality of vertically open spaces therein and bolt holes at opposite ends thereof and air bag cushions provided respectively inside the spaces of the frame. A door allowing the air bag cushion to deploy is provided at the bottom of the frame, and the top surface of the frame is closed to support a deploying force of the air bag cushion. The roof air bag mounting structure can be easily assembled and reduced in weight.

7 Claims, 3 Drawing Sheets

ROOF AIR BAG MOUNTING STRUCTURE

CROSS REFERENCE TO RELATED APPLICATION

The present application claims priority to Korean Patent Application Number 10-2009-0079676 filed on Aug. 27, 2009, the entire contents of which application is incorporated herein for all purposes by this reference.

BACKGROUND OF THE INVENTION

1. Field of the Invention

The present invention relates to a roof air bag mounting structure, more particularly, to one which can be easily assembled and reduced in weight.

2. Description of Related Art

In response to an increased awareness regarding the dangers of car collisions compared to the past, driver air bags and passenger side air bags, designed to protect a driver and a passenger in the seat next to the driver from accidents, are widely used at present. May luxury automobiles are equipped with a roof air bag, which covers the front of a rear seat passenger in the event of collision, thereby preventing the rear seat passenger from hitting the seat back of the front seat during a collision.

FIG. 1 is a top plan view illustrating a conventional roof air bag mounting structure, and FIG. 2 is a cross-sectional view of the conventional roof air bag mounting structure, taken along line A-A of FIG. 1.

Referring to FIG. 1, a conventional roof air bag includes a frame 10 consisting of separate frame parts, fixed above the head of a rear seat passenger, an air bag cushion 20 provided inside the frame 10, and bolts 30 fixing the frame 10.

However, the conventional roof air bag mounting structure has the following problems.

First, the conventional roof air bag mounting structure has to undergo a cumbersome bolt-fastening operation multiple times in order to fix the separate parts of the frame 10, respectively.

Second, since the frames 10 are located above the head of the rear seat passenger, a worker has to look up at a vehicle body roof 50 in order to fix the frame 10, which is inconvenient and uncomfortable.

Third, in the conventional roof air bag mounting structure, a separate support member 40 is interposed between the vehicle body roof 50 and the air bag cushion 20, thereby increasing the entire weight and manufacturing costs of an automobile.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a roof air bag mounting structure, which can be easily assembled.

In addition, there is provided a roof air bag mounting structure, which can be reduced in weight.

In an aspect of the present invention, the roof air bag mounting structure may include a frame having at least an open space therein and coupling members at opposite end portions thereof; and at least an airbag cushion provided inside the at least an open space of the frame, respectively wherein the frame mounts the at least an airbag cushion onto a vehicle body roof by the coupling members, wherein a door allowing a corresponding air bag cushion to deploy is provided at a bottom of the frame to cover a corresponding open space.

The frame may be monolithically formed.

The coupling members may be symmetrically provided in the opposite end portions of the frame with respect to a longitudinal axis of the frame.

A top surface of the frame may be closed to support a deploying force of the at least an air bag cushion.

The opposite end portions of the frame may be shaped to form downward bends or curves, and wherein the coupling members are disposed in the bends or curves of the frame, wherein the opposite end portions of the frame are formed in a shape conforming to a side of a vehicle body.

The frame may be elongated at a length corresponding to a width of a vehicle body.

The frame may have an arc-like shape to prevent the frame from sagging down.

The frame may be mounted to the vehicle body roof, with the air bag cushion brought into contact with the vehicle body roof, so that the vehicle body roof supports a deploying force of the at least an air bag cushion when the at least an air bag cushion is being deployed.

in accordance with various aspects of the present invention, the roof air bag mounting structure has the following effects:

First, the roof air bag mounting structure can be easily assembled to a vehicle body since the bolt-fastening operation for fixing the frame does not need to be performed multiple times.

Second, the roof air bag mounting structure can be easily assembled to a vehicle body since a worker can perform the bolt-fastening operation for fixing the frame while looking forwards.

Third, the roof air bag mounting structure can advantageously decrease the entire weight and manufacturing costs since a separate support member between the vehicle body roof and the air bag cushion is not required.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
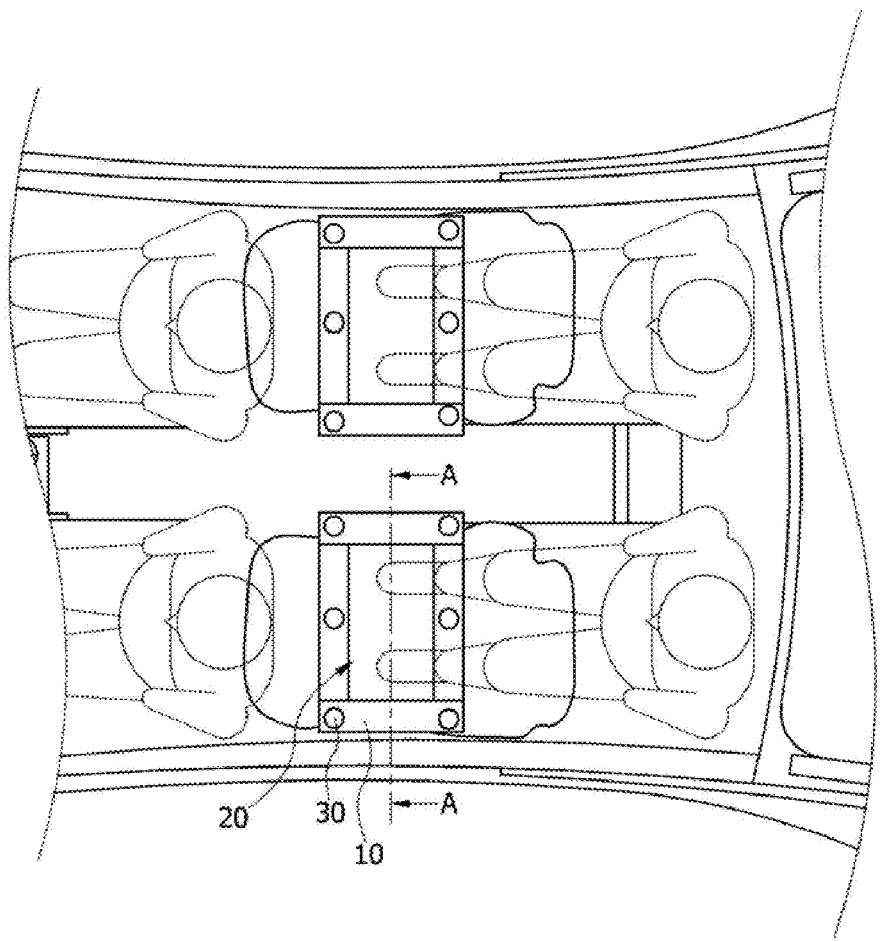
FIG. 1 is a top plan view illustrating a conventional roof air bag mounting structure.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 3:
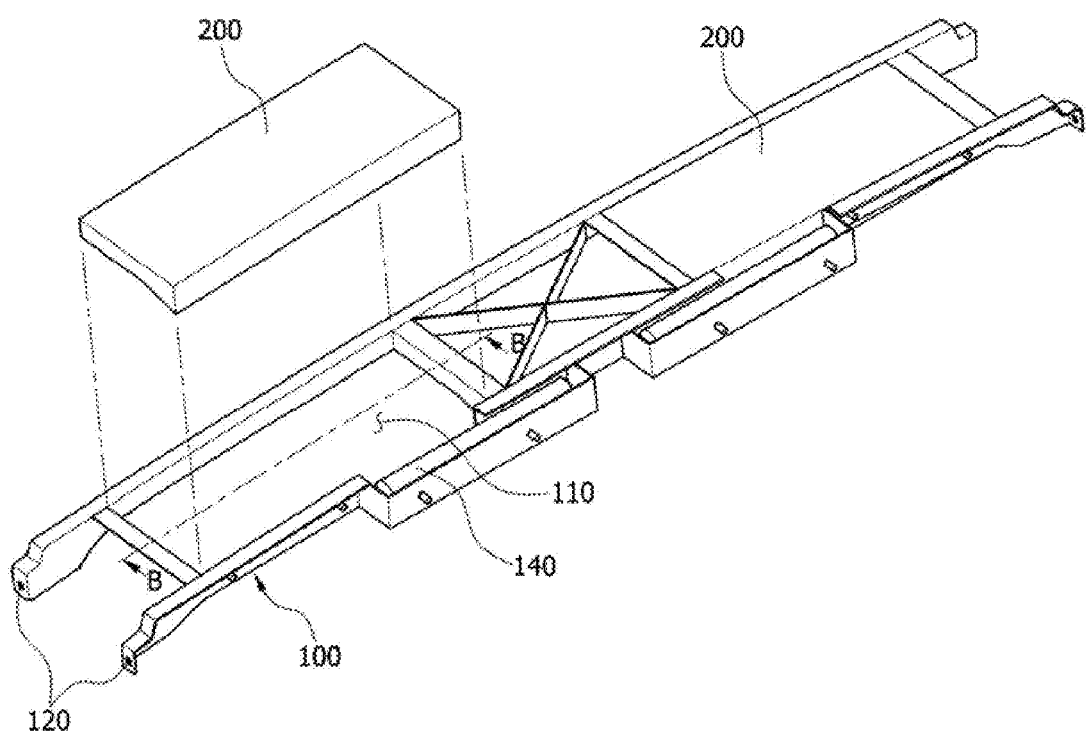
FIG. 3 is a perspective view illustrating a roof air bag mounting structure in accordance with an exemplary embodiment of the invention.
Figure 4:
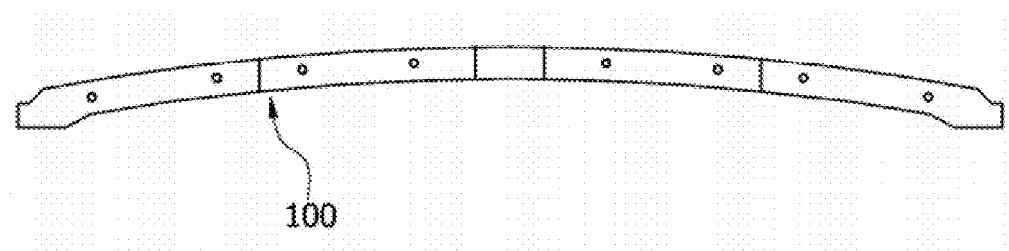
FIG. 4 is a front elevation view of the roof air bag mounting structure in accordance with an exemplary embodiment of the invention.
Figure 5:
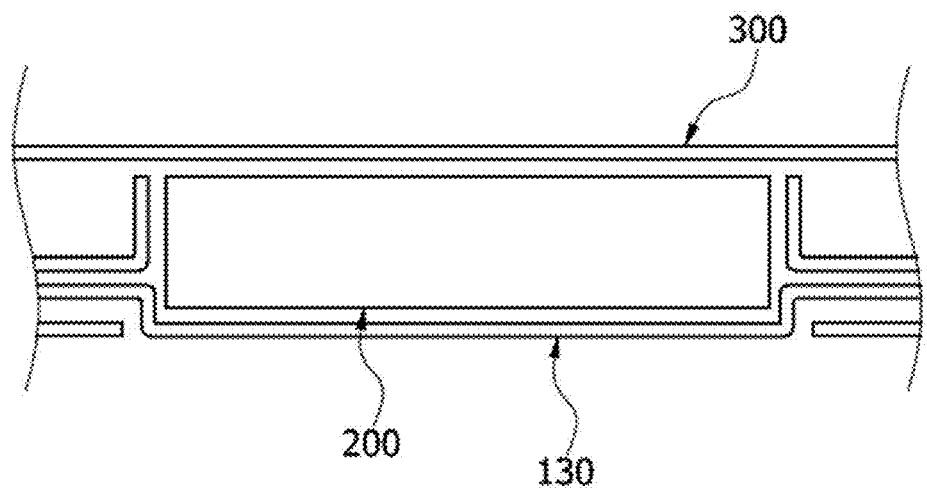
FIG. 5 is a cross-sectional view of the roof air bag mounting structure in accordance with an exemplary embodiment of the invention, taken along line B-B in FIG. 3.

FIG. 3 is a perspective view illustrating a roof air bag mounting structure in accordance with an exemplary embodiment of the invention, FIG. 4 is a front elevation view of the roof air bag mounting structure in accordance with an exemplary embodiment of the invention, and FIG. 5 is a cross-sectional view of the roof air bag mounting structure in accordance with an exemplary embodiment of the invention, taken along line B-B in FIG. 3

The roof air bag mounting structure in accordance with an exemplary embodiment of the invention includes a frame 100, which defines therein one or more vertically open spaces 110, and air bag cushions 200, which are provided inside the spaces 110, respectively. The frame 100 also has bolt holes 120 formed at opposite ends thereof. In the bottom of the frame 100, doors 130 are provided, each of which allows a corresponding air bag cushion 200 to deploy. The top surface of the frame 100 is closed to support the deploying force of the air bag cushions 200.

The frame 110 is fabricated as one body, with the spaces 100 defined therein to simultaneously fix respective air bag cushions 200. The bolt holes 120 are symmetrically provided in the opposite ends of the frame 100 so as to be fastened to a vehicle body by bolts. With the bolt holes 120 fastened to the vehicle body by the bolts, the frame 100 can be coupled to the interior of the vehicle body.

While the conventional mounting structure (see FIG. 1) has bolt holes along the frame 10, the mounting structure in accordance with an exemplary embodiment of the invention has the holes 120 only in the ends of the frame 100. This can reduce the total number of bolts to be screwed into the holes 120, thereby advantageously improving workability.

The opposite ends of the frame 100 are shaped to form downward bends or curves, and the holes 120 are formed in the bends or curves of the frame 100.

The opposite ends of the frame 100 are bent or curved in a shape conforming to a frame that forms a side of the vehicle body. With this configuration, the frame 100 can be tightly coupled to the side of the vehicle body.

In addition, the conventional mounting structure has inconveniences in that the worker has to look up from below when fastening bolts into specific positions of the frame 10 since the frame 10 is located above the passenger's head.

In accordance with an exemplary embodiment of the invention, as shown in FIG. 3, the bolt holes 120 are formed in the bends or curves at the opposite ends of the frame 100. Accordingly, the worker can look at the bolt holes 120 in the horizontal direction while working. This, as a result, can improve the efficiency and productivity of works as well as ensure uniform quality.

The frame 100 has an arc-like shape that prevents the frame 100 from sagging down.

In the conventional structure, as shown in FIG. 1, the frame 10 does not sag down since the frame 10 is not long in the lateral direction and the bolts are fastened along the frame 10. In contrast, in accordance with an exemplary embodiment of the invention, the frame 100 may sag down in the gravity direction since the frame 100 is elongated at a length corresponding to the width of the vehicle body and middle portions of the frame 100 are not fastened.

This is because a bending moment occurs due to a repulsive force corresponding to the weight of the frame 100 and inflators 140 as well as to the deploying force, which the air bag cushion 200 applies to a vehicle body roof 300 during the deployment of the air bag cushion 200.

In accordance with an exemplary embodiment of the invention, the frame 100 is manufactured into the shape of an arc, as shown in FIG. 4, in order to prevent the frame 100 from sagging down by the bending moment.

The frame 100, manufactured into the shape of an arc, can convert the vertical weight acting in the gravity direction to act in the axial direction. A moment is defined by a product of force and distance, and a force in the axial direction indicates a force acting on the axis. With this configuration, the distance between the axis and the force acting thereon is zero (0). Accordingly, the frame 100 can remove the bending moment, thereby preventing the frame 100 from sagging down.

In addition, in accordance with an exemplary embodiment of the invention, the frame 100 includes horizontal members and vertical members coupled to the bottom of the horizontal members in order to further prevent the frame 100 from sagging down.

The frame 100 is provided with the doors 130, each of which allows a corresponding air bag cushion 200 to deploy, and the inflators 140, each of which blows nitrogen gas into a corresponding air bag cushion 200. Descriptions of the doors 130 and the inflators 140 will be omitted since they are applied to common air bag systems.

The frame 100 can preferably be mounted on the vehicle body roof, with each air bag cushion 200 brought into contact with the vehicle body roof 300, so that the vehicle body roof 300 can support the deploying force of the air bag cushion 200 when the air bag cushion 200 is being deployed.

Figure 2:
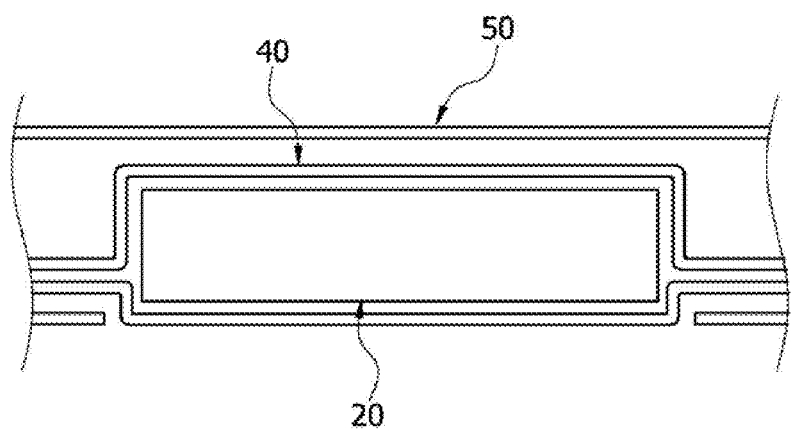
FIG. 2 is a cross-sectional view of the conventional roof air bag mounting structure, taken along line A-A in FIG. 1.

In the conventional roof air bag mounting structure (see FIG. 2), the separate support member 40 is interposed between the vehicle body roof 50 and the air bag cushion 20. The support member 40 serves to compress the air bag cushion 20 at normal times and to support the deploying force of the air bag cushion 20 in the event of vehicle collision so that the air bag cushion 20 is deployed downwards.

However, as shown in FIG. 5, the roof air bag mounting structure in accordance with an exemplary embodiment of the invention is configured such that the vehicle body roof 300 itself serves to compress the air bag cushion 200 while supporting the deploying force of the air bag cushion 200. Therefore, the roof air bag mounting structure in accordance with an exemplary embodiment of the invention can advantageously reduce the entire weight of a vehicle while reducing manufacturing costs of a roof air bag since the separate support member 40 (see FIG. 2) of the conventional air bag mounting structure is not interposed between the vehicle body roof 300 and the air bag cushion 200.

Furthermore, the roof air bag mounting structure in accordance with an exemplary embodiment of the invention can advantageously reduce the entire height of the roof air bag while increasing the interior space of the vehicle by excluding the support member of the conventional air bag mounting structure.

For convenience in explanation and accurate definition in the appended claims, the term "downward" is used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A roof air bag mounting structure comprising:
   a frame having at least an open space therein and coupling members at opposite end portions thereof; and
   at least an airbag cushion provided inside the at least an open space of the frame, respectively wherein the frame mounts the at least an airbag cushion onto a vehicle body roof by the coupling members,
   wherein a door allowing a corresponding air bag cushion to deploy is provided at a bottom of the frame to cover a corresponding open space,
   wherein the opposite end portions of the frame curve downwardly in a longitudinal direction thereof, and
   wherein the coupling members are disposed laterally of the downwardly curved opposite end portions of the frame.

2. The roof air bag mounting structure in accordance with claim 1, wherein the frame is monolithically formed.

3. The roof air bag mounting structure in accordance with claim 1, wherein the coupling members are symmetrically provided in the opposite end portions of the frame with respect to a longitudinal axis of the frame.

4. The roof air bag mounting structure in accordance with claim 1, wherein the opposite end portions of the frame are formed in a shape conforming to a side of a vehicle body.

5. The roof air bag mounting structure in accordance with claim 1, wherein the frame is elongated at a length corresponding to a width of a vehicle body.

6. The roof air bag mounting structure in accordance with claim 1, wherein the frame has an arc-like shape to prevent the frame from sagging down.

7. The roof air bag mounting structure in accordance with claim 1, wherein the frame is mounted to the vehicle body roof by the coupling members, with the air bag cushion brought into contact with the vehicle body roof, so that the vehicle body roof supports a deploying force of the at least an air bag cushion when the at least an air bag cushion is being deployed.

* * * * *